Dec. 13, 1927.
E. F. KAISER
1,652,363
GRASS CATCHER FOR LAWN MOWERS
Filed Nov. 3, 1925
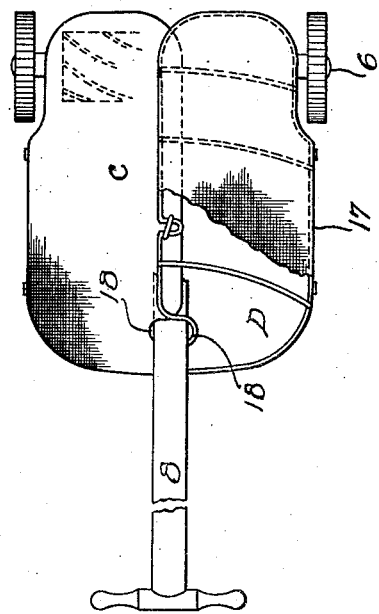
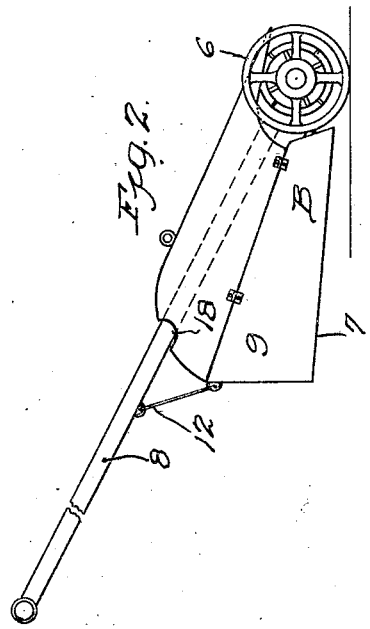
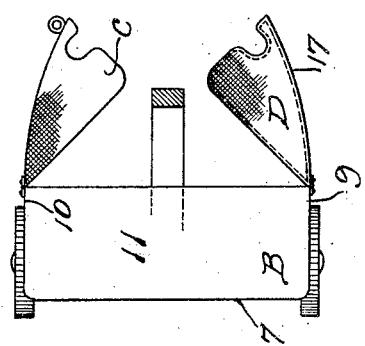
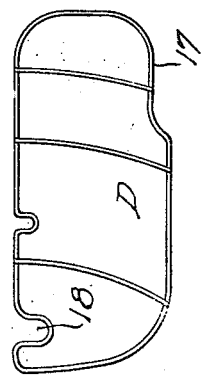
Emil F. Kaiser, Inventor
By Francis C. Huebner, Attorney Patented Dec. 13, 1927.

1,652,363

UNITED STATES PATENT OFFICE.

EMIL F. KAISER, OF FRESNO, CALIFORNIA.

GRASS CATCHER FOR LAWN MOWERS.

Application filed November 3, 1925. Serial No. 66,497.

My invention relates to a new and useful improvement on lawn mowers, and more particularly to the means for catching and holding the grass which has been cut by the mower.

Among the objects I have attained is a grass catcher which will prevent the grass from flying beyond and to the sides of the catcher, which can readily be opened to remove the cut grass, and which can be attached to common forms of grass catchers which have no coverings.

These and other objects hereinafter set forth are accomplished by means of the device hereinafter described and illustrated on the accompanying drawing, in which Fig. 1 shows a top view of the catcher assembled with a lawn mower. Fig. 2 is a side view of the device as shown in Fig. 1. Fig. 3 shows the frame of one of the wings of the catcher. Fig. 4 is a rear view of the catcher when partially opened.

Referring to said drawing I have shown a lawn mower 6, to which is attached a base B. Base B consists of a bottom 7 which can be a sheet of metal, wood, or fabric. If the bottom is fabric it should be held in a plane position by means of a stiff frame. Two sides 9 and 10 and a back 11 are provided. A support 12 assists in holding the bottom of the catcher a fixed distance from the mower handle 8.

It is here noted that the form of bottom for the grass catcher hereinbefore described is well known in the art. The special feature of my invention consists of two wings C and D which are hinged to the two sides 10 and 9 above described. Each wing consists of a wire frame, having a wire periphery 17 adapted to conform to the top of the sides 9 or 10, and approximately one half or slightly more of the back 11. Indents 18 should be made in the frame to encircle the handle 8 of the mower. These frames are covered with fabric or some equivalent. A wing is hinged to each side of the base so that when they are assembled the wings can be turned over so they meet or overlap. I have constructed the wings concave, and assemble them with the base so the convex surface is outside. This increases the size of the chamber when the wings and base are assembled.

It will be observed that my cover extends forward so that it covers the cutters of the mower as shown in Fig. 1. It is well known that when cutting grass, most of the grass is thrown rearward, but much of it is thrown upward and sidewise, and by extending the cover forward as described, the grass is directed into the rear compartment of the grass catcher regardless of the direction in which it is thrown.

It will be noted that by this device the grass which is thrown backward by the movement of the mower is caught in the catcher and the wings when adjusted will keep it from being thrown over the sides and back of the base.

I claim as new and ask for Letters Patent:

1. An attachment for a grass catcher adapted to be attached to a lawn mower, consisting of convex wings hinged to the sides of the catcher, said wings being positioned so they cover the top of the grass catcher and the cutting member of the mower, substantially as described.

2. An attachment for a grass catcher adapted to be attached to a lawn mower consisting of two convex wings hinged to the sides of the catcher with the convex side uppermost and adapted to cover the top of the catcher when closed, and to extend forward over the cutter.

EMIL F. KAISER.